US007886653B2

(12) United States Patent
Marconi

(10) Patent No.: US 7,886,653 B2
(45) Date of Patent: Feb. 15, 2011

(54) BUILT-IN COFFEE MACHINE AND RELATED ACTIVATION PROCESS

(75) Inventor: Giancarlo Marconi, Silea (IT)

(73) Assignee: De'Longhi S.p.A., Treviso (IT)

( * ) Notice: Subject to any disclaimer, the term of this patent is extended or adjusted under 35 U.S.C. 154(b) by 750 days.

(21) Appl. No.: 11/814,876

(22) PCT Filed: Nov. 15, 2005

(86) PCT No.: PCT/EP2005/012237

§ 371 (c)(1),
(2), (4) Date: Jul. 26, 2007

(87) PCT Pub. No.: WO2006/079376

PCT Pub. Date: Aug. 3, 2006

(65) Prior Publication Data

US 2008/0178742 A1 Jul. 31, 2008

(30) Foreign Application Priority Data

Jan. 28, 2005 (IT) .......................... MI2005A0118

(51) Int. Cl.
*A47J 31/44* (2006.01)
(52) U.S. Cl. ........................... 99/290; 99/279; 99/323.3
(58) Field of Classification Search ............... 99/279, 99/281, 285, 300, 304, 305, 306, 307, 290, 99/323.2; 312/242, 243; 222/129.1
See application file for complete search history.

(56) References Cited

U.S. PATENT DOCUMENTS 6,253,663 B1 * 7/2001 Spencer ........................ 99/279
6,321,638 B1 * 11/2001 Schmed ........................ 99/279

FOREIGN PATENT DOCUMENTS

| EP | 0783859 | 7/1997 |
|---|---|---|
| WO | 0203240 | 4/2002 |

* cited by examiner

*Primary Examiner*—M. Alexandra Elve
*Assistant Examiner*—John Wasaff
(74) *Attorney, Agent, or Firm*—Gottlieb, Rackman & Reisman, P.C.

(57) ABSTRACT

The built-in coffee machine (1) comprises an operation device (2) and a front panel (3) arranged on the front of the operation device and movable with respect to the cupboard (4) for containing the device from at least a first position closing the device inside the cupboard (4) to at least a second position for access to said device and vice-versa, with there also being an access opening (5) on the front panel at least to a dispenser of coffee drink and to a steam and/or water delivery group, the dispenser of the coffee drink and the steam and/or water delivery group (7) being directly connected to the operation device of the machine.

11 Claims, 3 Drawing Sheets

BUILT-IN COFFEE MACHINE AND RELATED ACTIVATION PROCESS

The present invention refers to a built-in coffee machine and to the related activation process.

For some time built-in coffee machines have been known on the market comprising an operation device carried by a drawer able to be withdrawn from a cupboard. The withdrawable drawer has a front panel to which the dispenser of the coffee drink, the steam/hot water delivery group and the drip tray are directly and rigidly connected.

Other known built-in coffee machines have a door arranged on front of the operation device and rotatable from a first position in which access to the operation device is prevented to a second position in which it is permitted. In this case the dispenser of the coffee drink, the steam/hot water delivery group and the drip tray are directly and rigidly connected to the door.

Known built-in coffee machines suffer from some drawbacks including the fact that it is rather difficult to gain access to the parts of the operation device, during the intervention operations for the loading of the water reservoir, the loading of the coffee and the adjustment of the coffee grinding, the emptying of the drip tray and of the used tablets, as well as during the cleaning and inspection operations for example of the brewing group.

In particular, the access to some parts can involve moving the entire operation device, which is sometimes bulky and heavy, and can therefore require large manoeuvring spaces.

The technical task proposed of the present invention is, therefore, that of making a built-in coffee machine that allows the aforementioned technical drawbacks of the prior art to be eliminated.

In this technical task a purpose of the invention is that of making a built-in coffee machine that allows easy and simplified access to every part thereof.

Another purpose of the invention is that of making a built-in coffee machine that allows access to every part thereof with simple actuations that require limited manoeuvring spaces.

Yet another purpose of the invention is that of making a built-in coffee machine that is not very bulky and not very heavy.

The technical task, as well as these and other purposes, according to the present invention, are accomplished by making a built-in coffee machine, comprising an operation device of said machine and a front panel arranged on the front of said operation device and movable with respect to the cupboard for containing said device from at least a first position closing said device inside said cupboard to at least a second position for access to said device and vice-versa, with there also being an access opening on said front panel at least to a dispenser of coffee drink and to a steam and/or water delivery group, characterised in that said dispenser of coffee drink and said steam and/or water delivery group are directly connected to said operation device of said machine.

The built-in machine of the present invention is of low bulk and has limited weight so that its removal from the cupboard requires little manoeuvring space and at the same time involves less effort for the user and less mechanical stresses for the sliding guides.

According to an advantageous characteristic of the present invention, moreover, the removal of the machine is only and exclusively required for the loading of the coffee and for the adjustment of the grinding.

Access to the operation device is possible without having to remove the machine from the cupboard, so that the inspection, cleaning and water filling operations are made easier.

The present invention also discloses an activation process of a built-in coffee machine, characterised in that to gain access to the brewing group it is necessary and sufficient to rotate the door to which the support dispenser of the coffee drink is integrally connected.

Other characteristics of the present invention are defined, moreover, in the subsequent claims.

Further characteristics and advantages of the invention shall become clearer from the description of a preferred but not exclusive embodiment of the built-in coffee machine according to the finding, illustrated for indicating and not limiting purposes in the attached drawings, in which.

Figure 1:
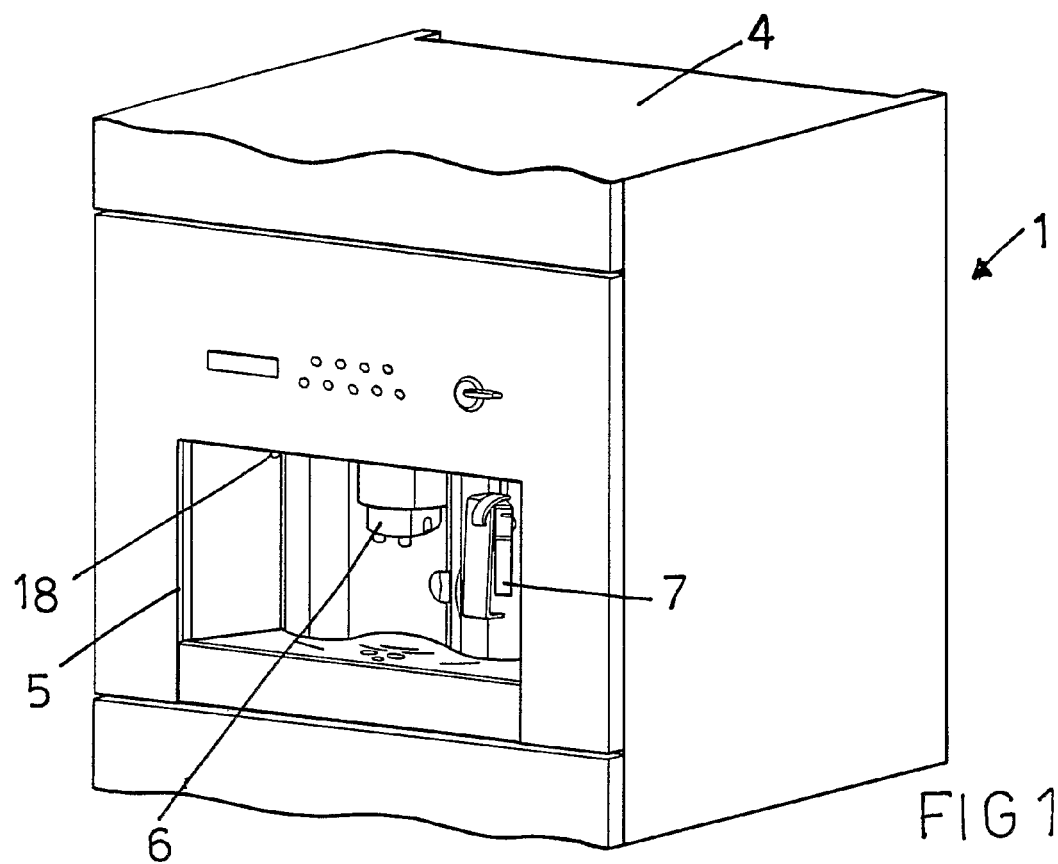
FIG. 1 shows a perspective view of a built-in coffee machine according to the invention in operating state.
Figure 2:
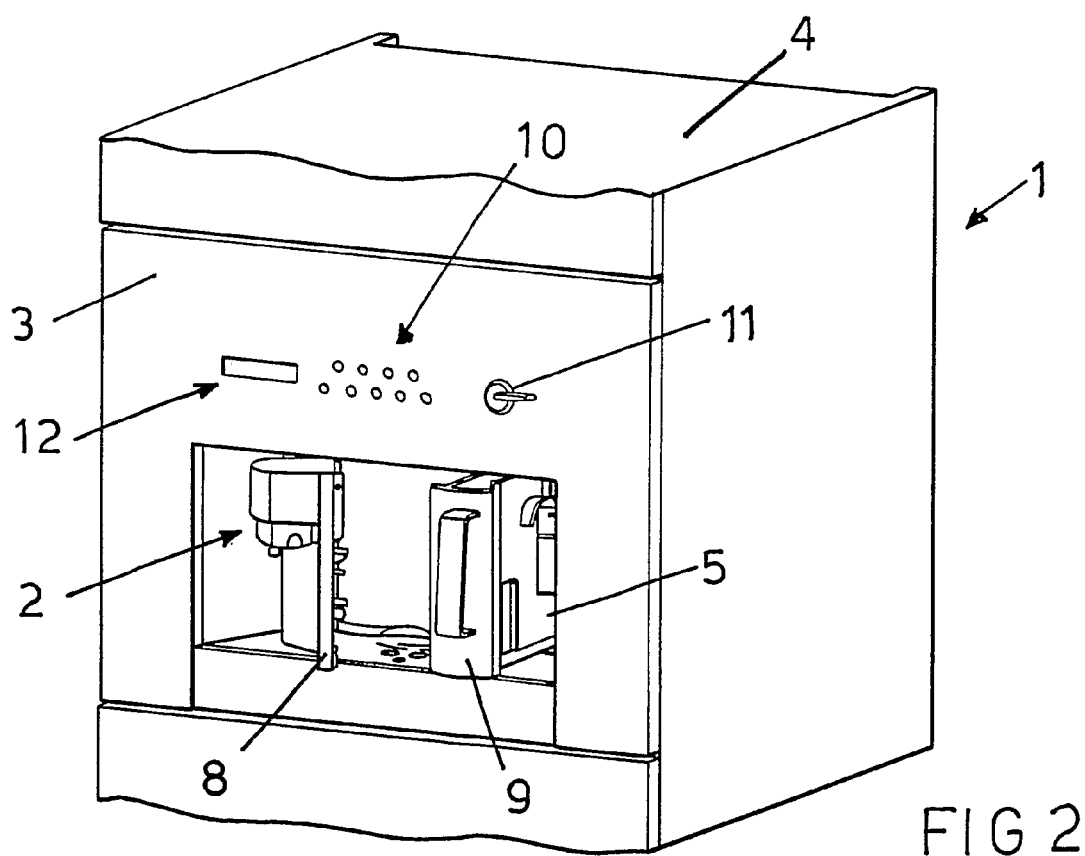
FIG. 2 shows the machine of FIG. 1 with the door open that allows access to the brewing group.
Figure 3:
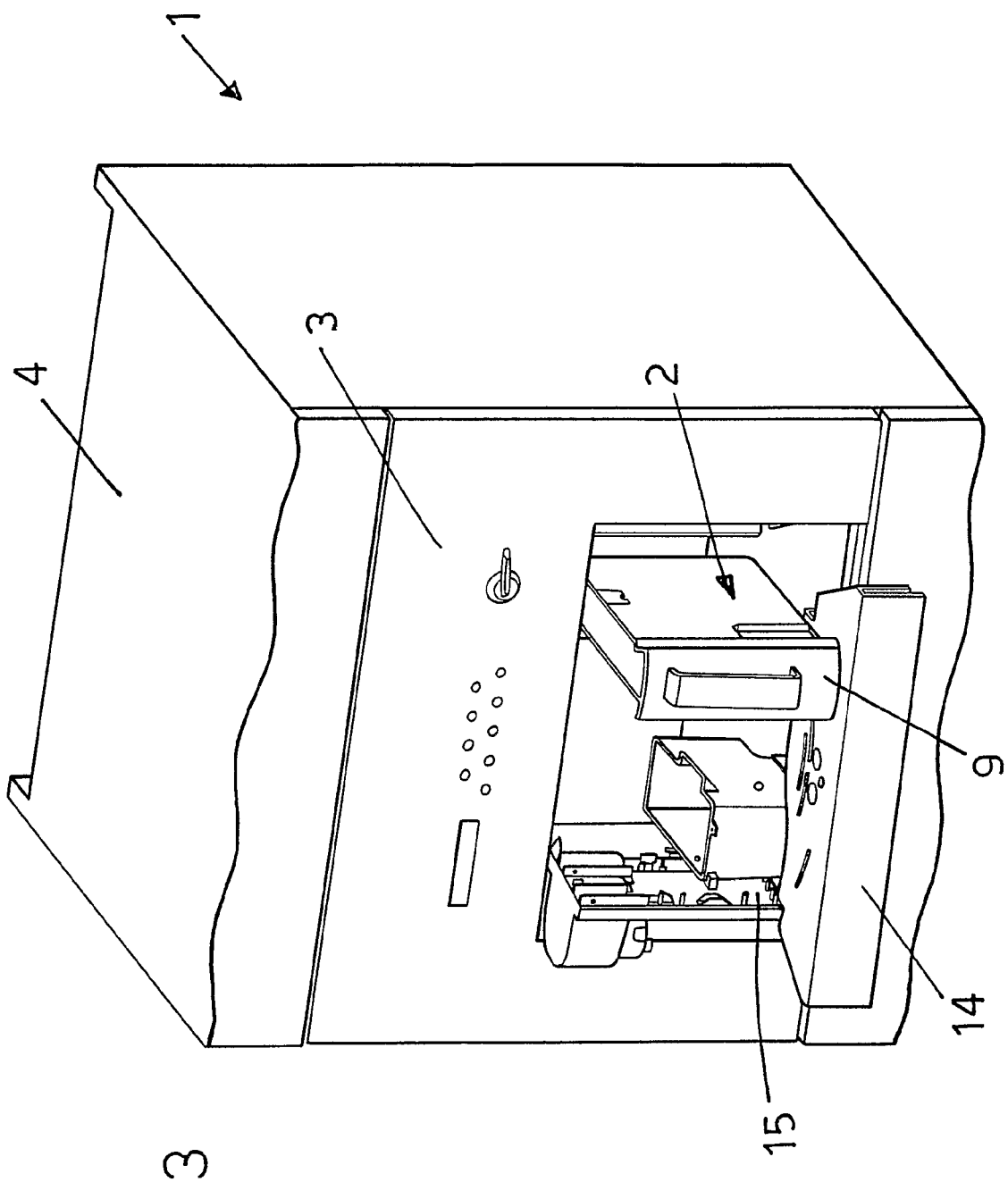
FIG. 3 shows the machine of FIG. 1 with the door open, and with the drip tray and the collector of the used tablets removed.
Figure 4:
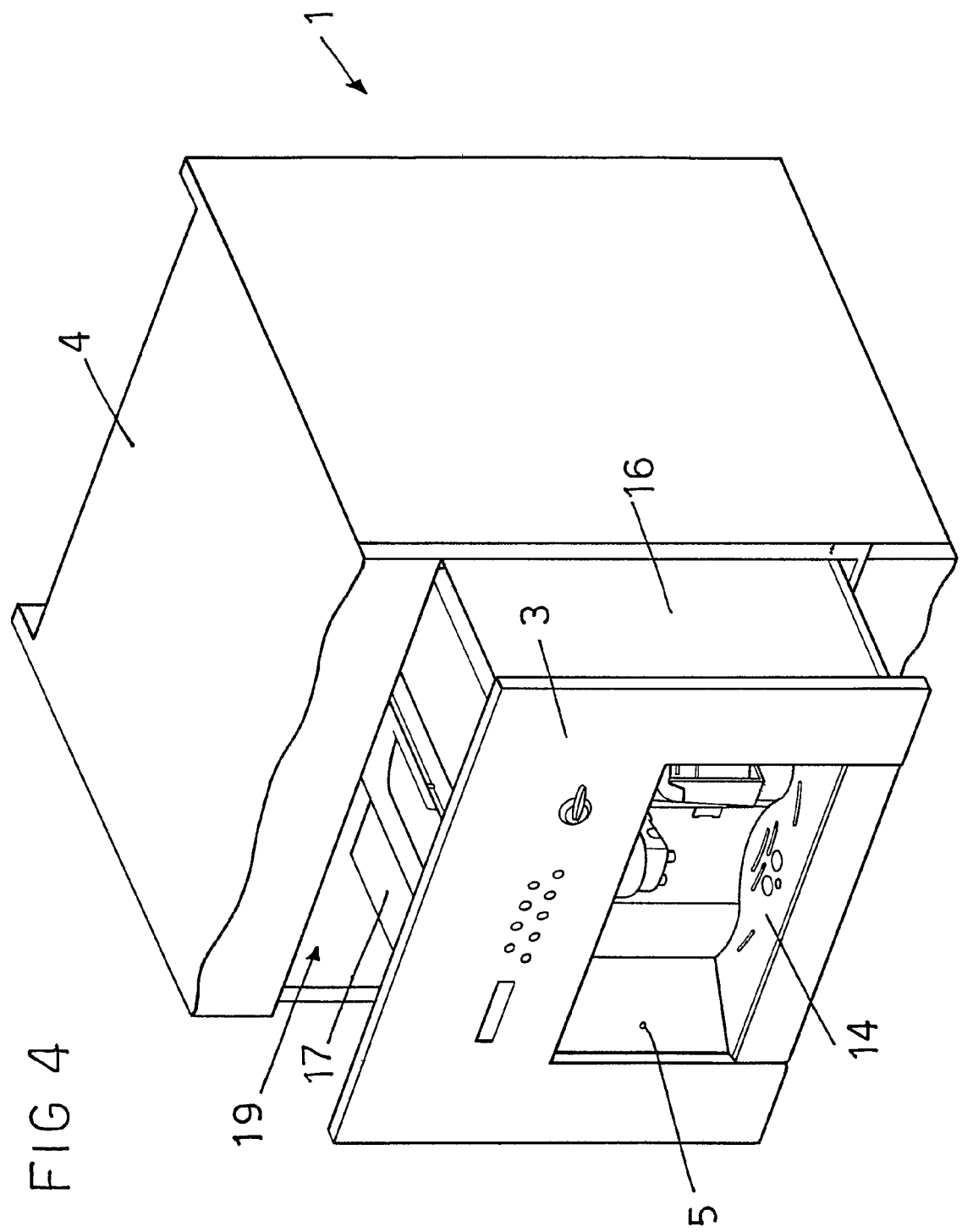
FIG. 4 shows the machine of FIG. 1 removed from the cupboard to allow the loading of the coffee bean container and of the pre-ground coffee container and for the adjustment of the grinding.

With reference to the quoted figures, a built-in coffee machine is shown, wholly indicated with reference numeral 1.

The coffee machine 1 comprises an operation device 2 and a front panel 3 arranged on front of the operation device 2.

The front panel 3 is movable with respect to the cupboard 4 for containing the device 2 from at least a first position closing the device 2 inside the cupboard 4 to at least a second position for access to the device 2 and vice-versa.

The front panel 3 has an access opening 5 at least to a dispenser 6 of the coffee drink and to a steam and/or water delivery group 7.

The front panel 3 is integral with a support element 16 of the device 2 slidably associated through sliding guides (not shown) with the cupboard 4.

The sliding guides allow translation movement of the device 2 in the direction perpendicular to the plane on which the front panel 3 lies from the first position closing the device 2 inside the cupboard 4 to the second position for access to the device 2 and vice-versa.

At the second position of the front panel 3 for access to the device 2, access to the coffee bean and pre-ground coffee container 17 is also allowed.

The front panel 3 also comprises the control means 10 at least of the dispenser 6 of the coffee drink and of the steam and/or water delivery group 7.

The control means 10 can comprise a control knob 11 of the steam and/or water delivery group 7 and a control and programming panel 13.

Again on the front panel 3 a display 12 is foreseen.

Both the dispenser 6 of the coffee drink and the steam and/or water delivery group 7 are directly connected to the operation device 2.

In particular, the dispenser 6 of the coffee drink is integrally connected to a door 8 rotatably associated with the operation device 2 of the machine 1.

The door 8 is rotatable about a vertical axis and in its trajectory is substantially confined, together with the dispensing group 6, within the access opening 5.

In open position the door 8 allows access to the brewing group (not shown), whereas the removable water reservoir 9 with which the drink is prepared is still accessible for loading also irrespective of the open or closed position of the door 8.

The water reservoir 9 can be autonomous or else directly connected hydraulically to the water mains.

The machine 1 also comprises a drip tray 14 that is accessible through the access opening 5.

The drip tray 14, positioned in use below the dispensing group of the coffee drink, is movable with respect to the front panel 3.

In particular, the drip tray 14 can be moved by translation from the operative retracted position inside the access opening 5 to a removal position outside the access opening 5.

When the door 8 is also open in the removal position the drip tray 14 can be emptied and frees access to the collector 15 of used coffee tablets behind it.

Advantageously, the rotatably door 8 and the drip tray 14 can be actuated irrespective of the positioning of the front panel 3.

In a preferred embodiment the machine 1 also comprises a light source 18 associated with the operation device 2 to light the access zone from the access opening 5.

Advantageously, the space 19 of the cupboard 4 inside which the machine 1 is housed substantially has a height of between 370 and 390 mm.

The machine 1, indeed, is extremely compact in height and overall is not very bulky and not very heavy.

This contributes to minimising the effort of the user to remove it and introduce it into the cupboard 1, and to limiting the mechanical stresses on the sliding guides, linked to the weight of the device 2, definitively promoting the preservation of the functional and structural integrity of the sliding guides themselves.

The present invention also discloses, as stated, an activation process of the coffee machine 1 described above.

In particular, to gain access to the brewing group it is necessary and sufficient to rotate the door 8.

To gain access to the container 15 of the used coffee tablets it is necessary and sufficient to rotate the door 8 into the open position and remove the drip tray 14.

Finally, to gain access to the coffee bean and/or pre-ground coffee container 17 and/or to the adjustment of the grinding of the coffee it is necessary and sufficient to remove the coffee machine 1 moving the front panel 3 from its first to its second position.

The built-in coffee machine thus conceived can undergo numerous modifications and variations, all of which are covered by the inventive concept; moreover, all of the details can be replaced with technically equivalent elements.

In practice, the materials used, as well as the sizes, can be whatever according to the requirements and the state of the art.

The invention claimed is:

1. Built-in coffee machine constructed and arranged to be contained in a cupboard, comprising:
    an operation device of said built-in coffee machine;
    a front panel arranged on the front of said operation device and movable with respect to the cupboard from at least a first position closing said operation device inside said cupboard to at least a second position for access to said operation device and vice-versa, with there also being an access opening on said front panel at least to a dispenser of coffee drink and at least one of a steam and water delivery group, wherein said dispenser of coffee drink and said steam and/or water delivery group are directly connected to said operation device of said machine;
    a drip tray accessible through said access opening and movable with respect to said front panel independently of the position of said front panel with respect to the cupboard; and
    a door rotatably mounted within said access opening, said dispenser of said coffee drink being integrally mounted on said door, and said door being configured so that it can be actuated independently of the position of said front panel with respect to the cupboard.

2. Machine according to claim 1, characterised in that said front panel includes a control means operating at least one of said dispenser of the coffee drink, said steam and water delivery group.

3. The built-in coffee machine of claim 1, said built-in coffee machine further comprising a coffee bean container and a pre-ground coffee container, characterised in that said device of said machine has access to the coffee bean and pre-ground coffee container when said front panel is in said second position.

4. The built-in coffee machine of claim 1, said built-in coffee machine further comprising a light source associated with said operation device of said machine.

5. The built-in coffee machine of claim 1, said built-in coffee machine further comprising a water reservoir, characterised in that said water reservoir is directly connected hydraulically to a water main.

6. The built-in coffee machine of claim 1, said built-in coffee machine characterized in that said front panel is integral with a support element of said operation device slidably associated through sliding guides with said cupboard.

7. The built-in coffee machine of claim 1, said built-in coffee machine characterized in that the space of said cupboard inside which said machine is housed substantially has a height of between 370 and 390 mm.

8. The built-in coffee machine of claim 1, said built-in coffee machine characterized further comprising a brewing group including a support dispenser of a coffee drink, said support dispenser being integrally connected to said door, characterised in that to gain access to the brewing group it is necessary and sufficient to rotate the door.

9. The built-in coffee machine of claim 8, said built-in coffee machine further comprising a container of used coffee and a characterised in that to gain access to the container of the used coffee it is necessary and sufficient to rotate the door and remove the drip tray.

10. The built-in coffee machine of claim 8, said built-in coffee machine further comprising at least a container including one of a coffee bean and a pre-ground coffee characterised in that to gain access to the container it is necessary and sufficient to remove the coffee machine moving the front panel from the first to the second position.

11. The built-in coffee machine of claim 10, wherein said container includes coffee beans, said activation process further comprising the step of grinding said coffee bean, said step of grinding being adjustable, wherein it is necessary and sufficient to move the coffee machine front panel from said first to said second to gain access to adjust said step of grinding said coffee bean.

* * * * *